United States Patent
Pinskiy et al.

(10) Patent No.: US 11,119,530 B1
(45) Date of Patent: Sep. 14, 2021

(54) ELECTRONIC DEVICE HAVING RELAXED TIMING CONSTRAINTS FOR MANAGEMENT ACCESSES

(71) Applicant: Marvell International Ltd., Hamilton (BM)

(72) Inventors: Alex Pinskiy, Ashkelon (IL); Eyal Herzog, Mevaseret Zion (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 211 days.

(21) Appl. No.: 16/176,815

(22) Filed: Oct. 31, 2018

Related U.S. Application Data

(60) Provisional application No. 62/616,293, filed on Jan. 11, 2018.

(51) Int. Cl.
  *G06F 1/10* (2006.01)
  *G06F 1/06* (2006.01)

(52) U.S. Cl.
  CPC . *G06F 1/10* (2013.01); *G06F 1/06* (2013.01)

(58) Field of Classification Search
  None
  See application file for complete search history.

(56) References Cited

U.S. PATENT DOCUMENTS

| | | | |
|---|---|---|---|
| 6,536,024 B1* | 3/2003 | Hathaway | G06F 1/10 327/295 |
| 9,722,613 B1* | 8/2017 | Schultz | H03K 19/17728 |
| 2009/0172352 A1* | 7/2009 | Sutou | G06F 15/7867 712/29 |
| 2016/0365857 A1* | 12/2016 | Stevens | H03K 21/40 |
| 2019/0163229 A1* | 5/2019 | Fahim | G06F 1/324 |
| 2019/0179990 A1* | 6/2019 | Schmit | G06F 30/3312 |
| 2019/0267997 A1* | 8/2019 | Sato | H03K 19/0016 |

* cited by examiner

*Primary Examiner* — Fahmida Rahman

(57) ABSTRACT

Aspects of the disclosure provide an electronic device. The electronic device can include a first clock gating circuit that is configured to receive a clock signal and selectively transmit a clock pulse of the clock signal when triggered, access circuitry configured to launch configuration data in response to receiving a write request from a management module and trigger the first clock gating circuit to generate a first clock pulse that is delayed by a first predetermined amount of time after the launch of the configuration data by the access circuitry, and a first memory element configured to capture the configuration data in response to receiving the delayed first clock pulse generated by the first clock gating circuit.

28 Claims, 10 Drawing Sheets

ELECTRONIC DEVICE HAVING RELAXED TIMING CONSTRAINTS FOR MANAGEMENT ACCESSES

INCORPORATION BY REFERENCE

This present disclosure claims the benefit of U.S. Provisional Application No. 62/616,293, "Timing Constraints Relaxation of Management Accesses at High Scale Asics" filed on Jan. 11, 2018, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A high-end application specific integrated circuit (ASIC) typically are configured with millions of registers for storage of configuration data or status data. A management module outside the ASIC may access those registers for configuration or monitoring purpose via a management interface within the ASIC. During a process of designing such an ASIC, a place-and-route tool may insert a large amount of buffers between the management interface and the millions of registers in order to ensure that signals that are transmitted throughout the integrated circuit satisfy various timing constraints mandated by a desired clock speed of the ASIC. As a result, cell count and die area as well as static and dynamic power consumption may increase due to the large number of inserted buffers.

SUMMARY

Aspects of the disclosure provide an electronic device. The electronic device can include a first clock gating circuit that is configured to receive a clock signal and selectively transmit a clock pulse of the clock signal when triggered, access circuitry configured to launch configuration data in response to receiving a write request from a management module and trigger the first clock gating circuit to generate a first clock pulse that is delayed by a first predetermined amount of time after the launch of the configuration data by the access circuitry, and a first memory element configured to capture the configuration data in response to receiving the delayed first clock pulse generated by the first clock gating circuit.

In an embodiment, the first memory element is further configured to launch the configuration data in response to receiving a second clock pulse generated by the first clock gating circuit, and the access circuitry is further configured to trigger the first clock gating circuit to generate the second clock pulse in response to receiving a read request from the management module, and capture the configuration data launched by the first memory element after a second predetermined amount of time since the launch of the configuration data by the first memory element.

In an embodiment, the electronic device further includes first user circuitry that is controlled by the clock signal and receives the configuration data from the first memory element. The first memory element is spaced more than a cycle of the clock signal away from the access circuitry, but less than a cycle of the clock signal away from the first user circuitry.

In an embodiment, the electronic device further includes a second memory element configured to launch status data in response to a third clock pulse generated by the first clock gating circuit. In this embodiment, the access circuitry is further configured to trigger the first clock gating circuit to generate the third clock pulse in response to receiving a read request from the management module, and capture the status data launched by the second memory element after a third predetermined amount of time since the launch of the status data by the second memory element. In one example, the electronic device further includes second user circuitry that is controlled by the clock signal and provides the status data to the second memory element, where the second memory element is spaced more than a cycle of the clock signal away from the access circuitry, but less than a cycle of the clock signal away from the second user circuitry.

In an embodiment of the electronic device, the access circuitry further includes a second clock gating circuit configured to receive the clock signal and selectively transmit a clock pulse of the clock signal when triggered, a third memory element configured to launch the configuration data in response to a fourth clock pulse generated by the second clock gating circuit, and a control circuit configured to trigger the second clock gating circuit to generate the fourth clock pulse in response to receiving the write request from the management module and trigger the first clock gating circuit to generate the first clock pulse that is delayed by the first predetermined amount of time after the launch of the configuration data by the third memory element.

In one example, the access circuitry further includes a fourth memory element that is configured to, in response to a fifth clock pulse generated by the second clock gating circuit, capture the configuration data launched from the first memory element. The control circuit of the access circuitry is further configured to trigger the first clock gating circuit to generate a clock pulse to trigger the launch of the configuration data from the first memory element in response to receiving a read request from the management module, and trigger the second clock gating circuit to generate the fifth clock pulse that is delayed by a second predetermined amount of time after the launch of the configuration data from the first memory element.

In another example, the access circuitry further comprises a fourth memory element that is configured to, in response to a fifth clock pulse generated by the second clock gating circuit, capture status data launched from a second memory element. The control circuit of the access circuitry is further configured to trigger the first clock gating circuit to generate a clock pulse to trigger the launch of the status data from the second memory element in response to receiving a read request from the management module, and trigger the second clock gating circuit to generate the fifth clock pulse that is delayed by a third predetermined amount of time after the launch of the status data from the second memory element.

In an embodiment, the access circuitry further includes a third memory element configured to launch the configuration data in response to a fourth clock pulse generated by the first clock gating circuit, and a control circuit configured to trigger the first clock gating circuit to generate the fourth clock pulse in response to receiving the write request from the management module, and trigger the first clock gating circuit to generate the first clock pulse that is delayed by the first predetermined amount of time after the launch of the configuration data by the third memory element.

In one example, the access circuitry further includes a fourth memory element that is configured to, in response to a fifth clock pulse generated by the first clock gating circuit, capture the configuration data launched from the first memory element. The control circuit of the access circuitry is further configured to trigger the first clock gating circuit to generate a clock pulse to trigger the launch of the configuration data from the first memory element in response to receiving a read request from the management module, and trigger the first clock gating circuit to generate the fifth clock pulse that is delayed by a second predetermined amount of time after the launch of the configuration data from the first memory element.

In one example, the access circuitry further includes a fourth memory element that is configured to, in response to a fifth clock pulse generated by the first clock gating circuit, capture status data launched from a second memory element. The control circuit of the access circuitry is further configured to trigger the first clock gating circuit to generate a clock pulse to trigger the launch of the status data from the second memory element in response to receiving a read request from the management module, and trigger the first clock gating circuit to generate the fifth clock pulse that is delayed by a third predetermined amount of time after the launch of the status data from the second memory element.

In one example, the access circuitry further includes an address decoder circuit configured to select a path between the third or fourth memory element and a plurality of memory elements for a write or read operation according to an address included in the read or write request received from the management module. The plurality of memory elements are controlled by gated clock pulses generated by the first clock gating circuit. In one example, the control circuit is controlled by the clock signal.

Aspects of the disclosure provide a method. The method includes launching, by access circuitry in an electronic device, configuration data in response to receiving a write request from a management module, triggering, by the access circuitry, a first clock gating circuit to generate a first clock pulse of a clock signal that is received at the first clock gating circuit, the first clock pulse of the clock signal being delayed by a first predetermined amount of time after the launch of the configuration data by the access circuitry, and capturing, by a first memory element, the configuration data in response to receiving the delayed first clock pulse of the clock signal generated by the first clock gating circuit.

Aspects of the disclosure provide an integrated circuit. The integrated circuit includes a clock gating circuit that is configured to receive a clock signal and selectively to transmit a clock pulse of the clock signal when triggered, access circuitry configured to launch configuration data in response to receiving a write request from a management module and trigger the clock gating circuit to generate a first clock pulse that is delayed for a predetermined amount of time after the launch of the configuration data by the access circuitry, and a memory element configured to capture the configuration data in response to receiving the delayed first clock pulse of the clock signal generated by the clock gating circuit.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
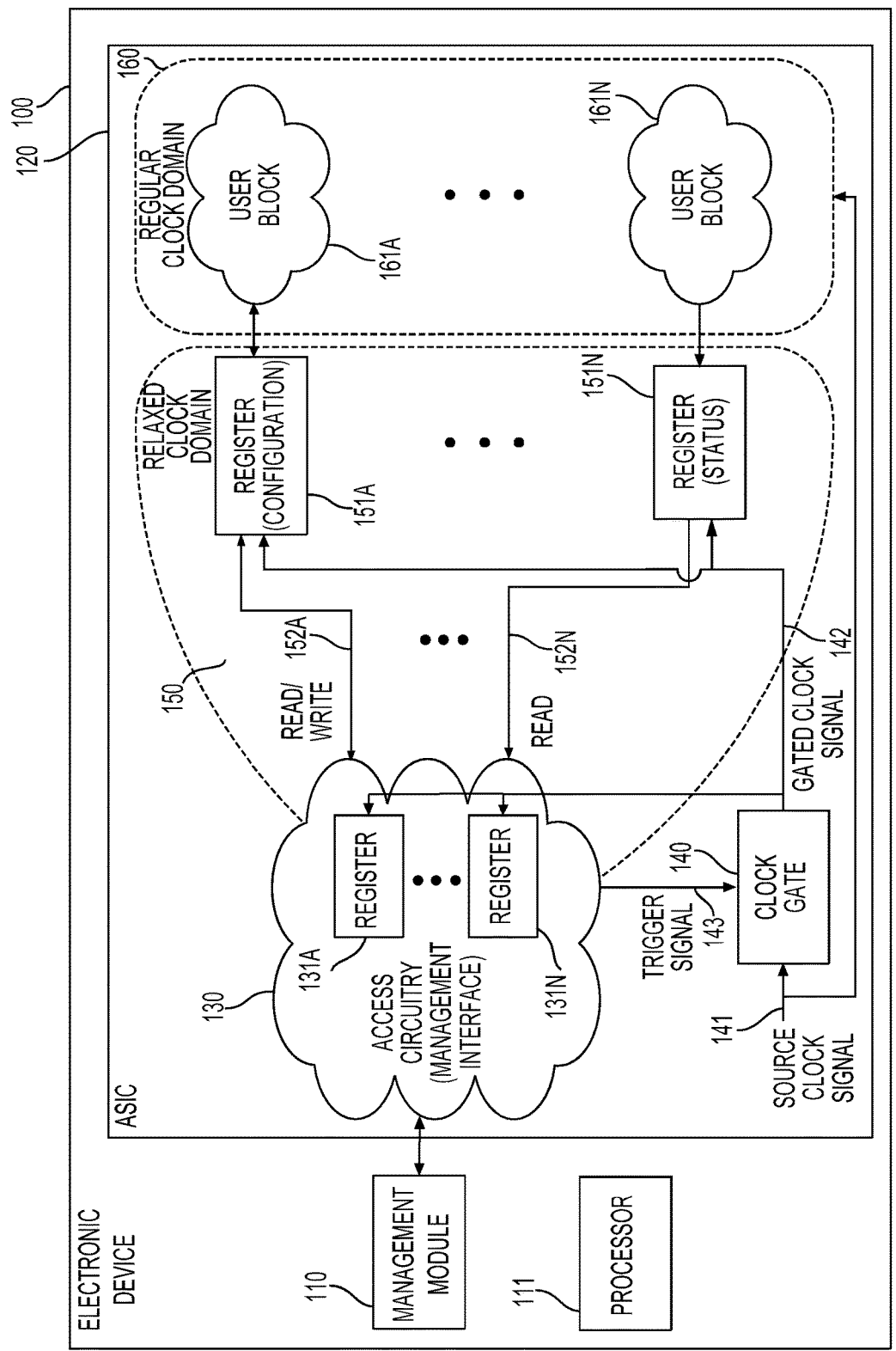
FIG. 1 shows an electronic device according to an embodiment of the disclosure.

FIG. 1 shows an electronic device 100 according to an embodiment of the disclosure. The electronic device 100 includes a management module 110, a processor 111, and an application specific integrated circuit (ASIC) 120. The ASIC 120 includes access circuitry 130, a clock gate 140, a plurality of configuration or status registers 151A-151N, and a plurality of user blocks 161A-161N. The access circuitry 130 includes a plurality of registers 131A-131N. The components are coupled together as shown in FIG. 1 in an embodiment. In various examples, the electronic device 100 is a computer, a server, a mobile device, a network device (e.g., switch, or router), an electronic system installed in a vehicle, or the like.

According to an aspect of the disclosure, portions of the ASIC 120 are divided into different clock domains. For example, the ASIC 120 shown in FIG. 1 includes both a relaxed clock domain 150 and a regular clock domain 160. Elements of the regular clock domain 160 are driven by a source clock signal 141, while those in the relaxed clock domain 150 operate according to a slower gated clock signal 142. As a result, timing constraints over data paths 152A-152N for transmission of configuration or status data is relaxed compared with the regular clock domain 160 governed by the source clock signal 141. This timing constraint relaxation scheme allows the registers 151A-151N to be located at a propagation distance of multiple cycles of the source clock signal 141 away from the access circuitry 130.

In FIG. 1, the management module 110 is configured to perform management functions related to the ASIC 120. For example, the management module 110 is configured to write configuration data to the registers in the ASIC 120 to adjust behaviors of the ASIC 120 when the ASIC 120 is initialized or while the ASCI 120 is operating. The management module 110 is configured to read configuration data or status data from registers in the ASIC to monitor a state of the ASIC 120. In one example, the management module 110 is implemented as software instructions that, when executed by the processor 111, cause the processor 111 to perform the management functions related with the ASIC 120.

The ASIC 120 is an integrated circuit customized for a specific application. Examples of the specific applications include packet processing and forwarding in a network device, wireless communication modem in a mobile device, peripheral equipment in a computer (e.g., storage device, printer, wired or wireless communication device, touch screen, video card, etc.), a self-driving system in a vehicle, and the like.

As shown, the ASIC 120 includes registers 151A-151N for storing configuration data, and status registers for storing status data. For example, the register 151A is a configuration register that receives configuration data from the management module 110 and provides the configuration data to an associated user block 161A. In contrast, the register 151N is a status register that receives status data from an associated user block 161N and provides the status data to the management module 110 outside the ASIC 120. The configuration register 151A is also configured to provide the stored configuration data to the management module 110 when needed. Of course, data stored in a configuration register or a status register may be used by components within the ASIC 120 for other purposes, such as monitoring status of respective functional modules.

Numbers of the registers 151A-151N vary in different examples depending on applications of the ASIC 120. In a typical high-end ASIC, a number of the registers 151A-151N can be in a range from thousands to millions. In one example, the registers 151A-151N each include a set of flip-flops that can be used to store data.

The ASIC 120 also includes user blocks 161A-161N that are coupled to and use one or more respective registers 151A-151N. For example, each of the user blocks 161A-161N either operates according to configuration data stored in an associated configuration register, or provide status data to an associated configuration register 151A-151N. As shown, each of the registers 151A-151N is associated with one or more user blocks 161A-161N, and each of the user blocks 161A-161N is associated with one or more configuration registers and/or status registers.

In an example, the electronic device 100 is a network device, such as a router or switch, and the ASIC 120 is a customized integrated circuit for processing and forwarding packets received from networks connected to the electronic device 100. In such an example, the user blocks 161A-161N each correspond to a functional module of the ASIC 120, such as a classification module configured to filter packets according to a policy database, a packet modification module configured to modify headers of the packet according to a rule, a packet forwarding module configured to forward packets according to a routing or forwarding table, and the like. The modules can be implemented by circuits of the user blocks 161A-161N.

The ASIC 120 includes an access circuitry 130 that is configured to perform write or read operations according to write or read requests received from the management module 110. For example, the access circuitry 130 implements a management interface that communicates with the management module 110 based on a communication protocol, such as the communication protocols specified in standards of Peripheral Component Interconnect (PCI), PCI Express, Serial Peripheral Interface (SPI), and Inter-integrated Circuit (I2C), or proprietary protocols, in an embodiment.

In one example, the management module 110, or part of the functions of the management module 110 is implemented as an on-chip module within the ASIC 120. In such scenario, the access circuitry can implement a management interface that communicates with the on-chip module based on an on-die/on-chip connectivity protocol, such as Advanced High performance (AHB) protocol, Advanced System Bus (ASB) protocol, Advanced Peripheral Bus (APB) protocol, Advanced Extensible Interface (AXI), and other similar on-chip communication protocols.

For example, the access circuitry 130 receives write requests or read requests from the management module 110. A write request includes to-be-stored configuration data and an address associated with a configuration register to receive the respective configuration data. A read request includes an address associated with a status register or a configuration register. Based on the received write or read request, the access circuitry 130 performs a respective write or read operation.

The registers 131A-131N are employed for storage of different types of data, such as read data from status registers or configuration registers 151A-151N, write data to be stored in configuration registers (e.g., configuration register 151A), or address data for selection of a targeted status or configuration register.

The ASIC 120 also includes a clock gate 140 that is configured to gate (or suppress) the source clock signal 141 in order to generate the gated (or suppressed) clock signal 142. The clock gate 140 can be responsive to a trigger signal 143 that is received from the access circuitry 130. For example, in an embodiment, the source clock signal 141 includes sequential cycles of the source clock signal 141. Each cycle of the source clock signal 141 lasts one period of the source clock signal 141, and corresponds to a pulse of the source clock signal 141. The clock gate 140 is in an off state when not triggered, such that no signal is transmitted from the clock gate 140. When triggered by a trigger signal 143, the clock gate 140 temporarily switches to an open state and allows the source clock signal 141 to pass the clock gate 140. The open state lasts for one period of the source clock signal 141, such that a pulse of the source clock signal 141 (a non-suppressed portion) passes the clock gate 140 forming the gated clock signal 142. Accordingly, the gated clock signal 142 occurs when the trigger signal 343 occurs. The generated gated clock signal 142 transmits to the registers 131A-131N and the registers 151A-151N and triggers the respective registers to capture (receive) or launch (transmit) data.

According to an aspect of the disclosure, the access circuitry 130 controls the clock gate 140 to create the relaxed clock domain 150 as shown in FIG. 1. In the relaxed clock domain 150, a timing constraint over data paths 152A-152N for transmission of configuration data or status data between the registers 131A-131N and the registers 151A-151N is relaxed compared with the regular clock domain 160 controlled by the source clock signal 141 that is not gated. This timing constraint relaxation scheme allows the registers 151A-151N to be located at a propagation distance of multiple cycles of the source clock signal 141 away from the access circuitry 130 without a need for intervening flip flops or buffer registers that conventionally are required to maintain a transmitted signal while satisfying timing constraints.

The timing constraint relaxation scheme provides an ASIC allocation tools with the freedom of placing user blocks at desired locations without increase of cell count or power consumption caused by additional intervening buffer registers. For example, in the FIG. 1 example, the user blocks 161A-161N are disposed near on-chip memories which are typically located near edges of a die or a layout partition in a layout of the ASIC 120. The registers 151A-151N are disposed close to respective user blocks 160A-160N. As the timing constraint is relaxed for data paths 152A-152N between the registers 151A-151N and the access circuitry 130, no additional buffer registers are needed to partition the data paths 152A-152N in order to have shorter propagation time over the partitioned data paths than a respective timing constraint. In addition, timing limitations on combinational access logic circuits along the data path 152A-152N are also relaxed. Those access logic circuits can thus be optimized without limitations of the timing constraint.

While the ASIC 120 is used as an example for illustration of the timing constraint relaxation concept, it is noted that the timing constraint relaxation scheme is not limited to ASICs. Of course, other types of integrated circuits (ICs) designed for general-purpose use may also employ the timing constraint relaxation scheme that relaxes a timing constraint over a data path by controlling a clock gating circuit.

Figure 2:
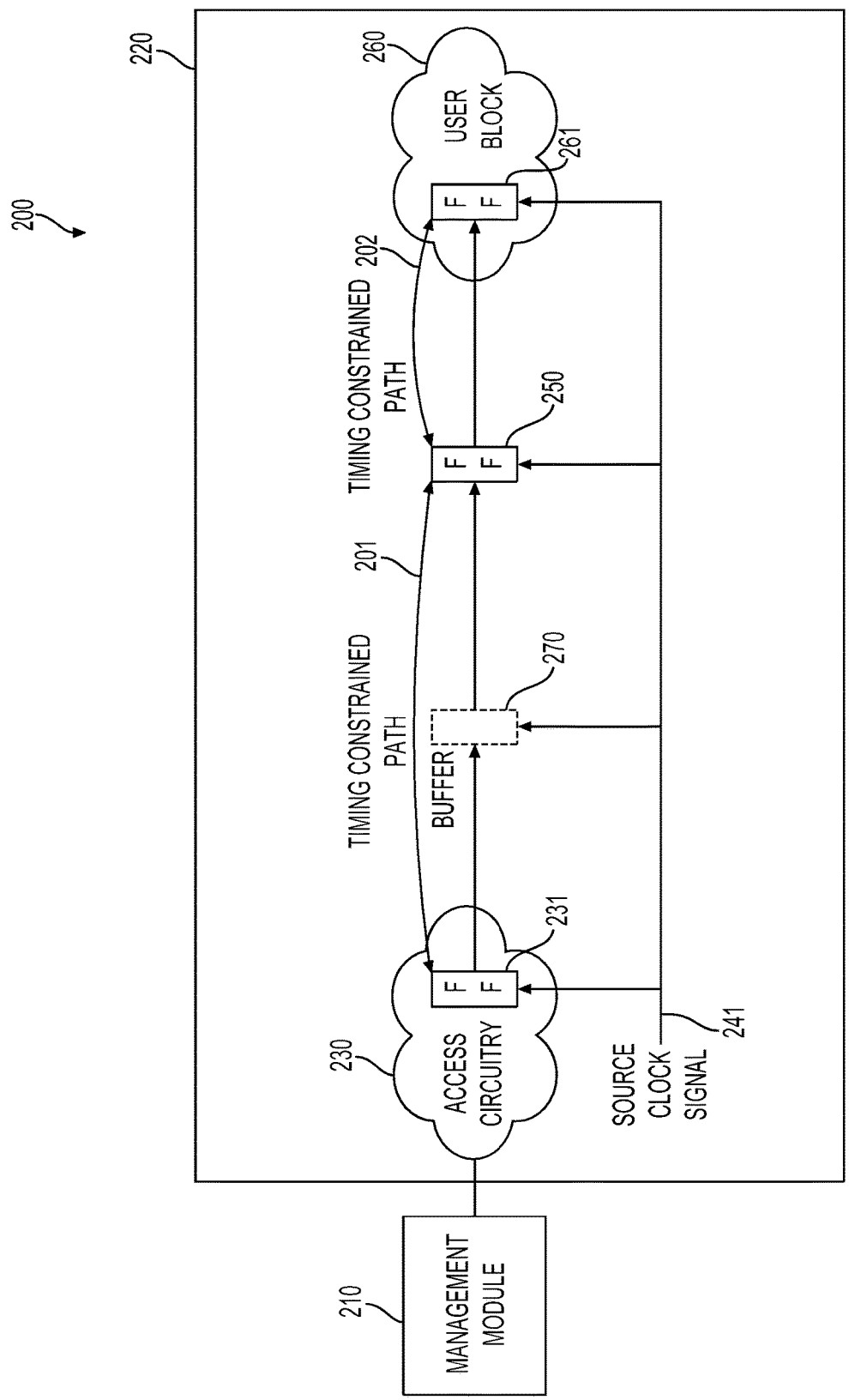
FIG. 2 shows an example electronic device in which a buffer is added to solve a timing constraint violation problem.

FIG. 2 shows an example electronic device 200 in which a buffer is added to solve a timing constraint violation problem. As shown, a management module 210 is coupled to an ASIC 220. A buffer flip-flop 270 is inserted between a launch flip-flop 231 and a capture flip-flop 250 in order to satisfy a timing constraint determined by a source clock signal 241. The ASIC 220 includes access circuitry 230, the capture flip-flop 250, and a user block 260. The capture flip-flop 250 can be a flip-flop of a configuration register in the FIG. 1 example. The access circuitry 230 includes the launch flip-flop 231 for launching configuration data to be captured by the capture flip-flop 250. A first data path 201 is formed between the launch flip-flop 231 and the capture flip-flop 250. The user block 260 includes a user flip-flop 261 that receives configuration data stored in the capture flip-flop 250. A second data path 202 is formed between the capture flip-flop 250 and the user flip-flop 261.

Assuming the buffer flip-flop 270 does not exist, the flip-flops 231, 250 and 261 operates as a sequential circuit governed by the source clock signal 241. To work properly, both the first timing constrained path 201 and the second timing constrained path 202 need to satisfy the timing constraint of the source clock signal 241. Specifically, the propagation delay along the path 201 or 202 (including an output delay at a respective launch flip-flop and a setup time at a respective capture flip-flop) needs to be less than at least a cycle of the source clock signal 241. When the user block 260 is disposed far away from the access circuitry 230, for example, in order to be close to an on-chip memory, the propagation delay along the data paths 210 and 202 may end up being more than two times the period of a cycle of the source clock signal 241. Under such a configuration, no matter which location where the flip-flop 250 is disposed, either at a location relatively close to the user block 260 at the right side or at a location close to the access circuitry 230 at the left side, one of the two data paths 201 and 202 would violate the respective timing constraint. To resolve this problem, buffer flip-flop 270 is employed and inserted between the launch flop-flop 231 and the capture flip-flop 250. As a result, cell count and power consumption would be caused to increase.

Figure 3:
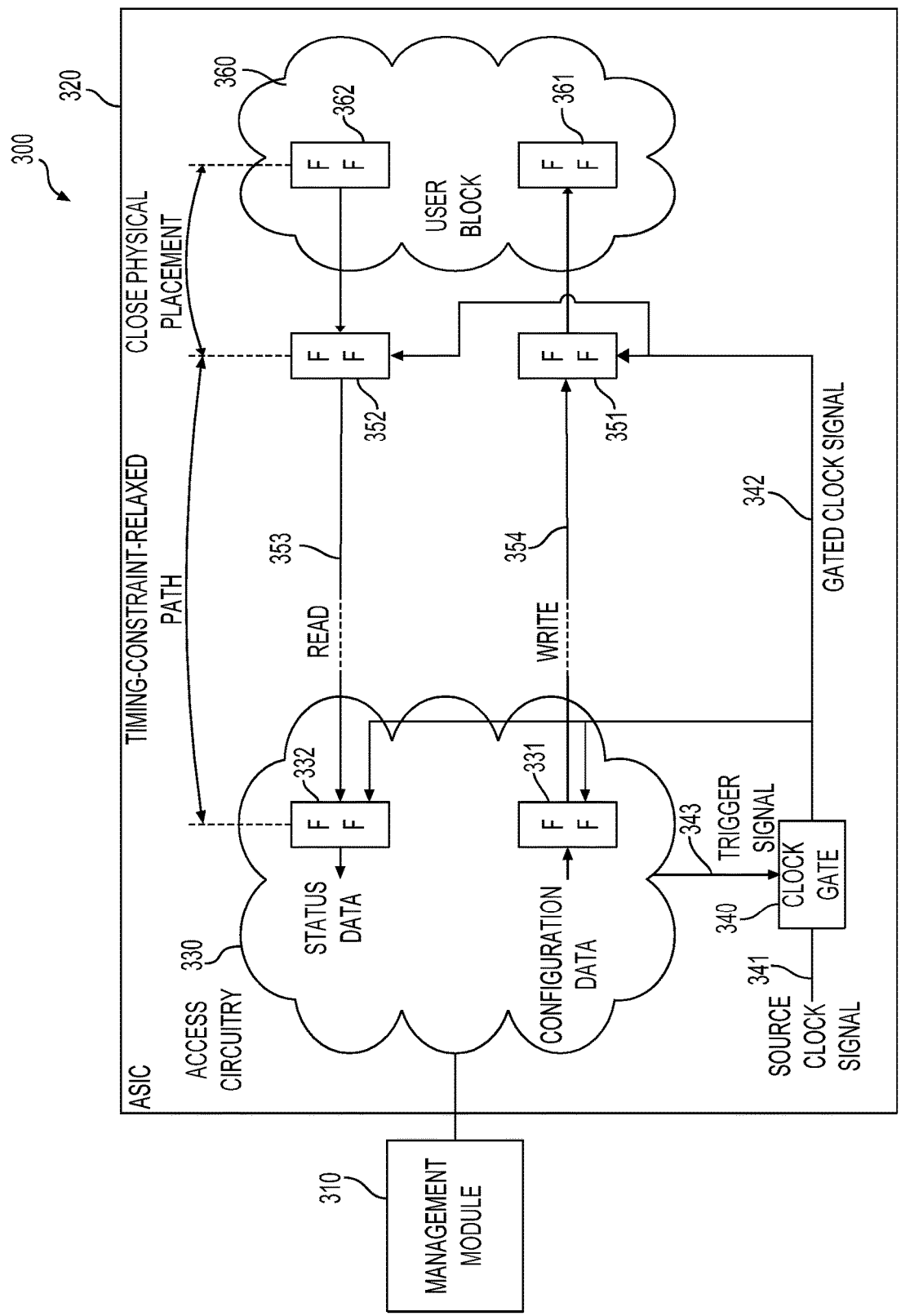
FIG. 3 shows an electronic device employing a clock gate to relax timing constraints over data path according to an embodiment of the disclosure.

FIG. 3 shows an electronic device 300 according to an embodiment of the disclosure. Similar to the FIG. 1 and FIG. 2 examples, the electronic device 300 includes a management module 310 and an ASIC 320. The ASIC 320 includes access circuitry 330, a flip-flop 351 for storing configuration data, a flip-flop 352 for storing status data, a user block 360, and a clock gate 340. The access circuitry 330 further includes a write flip-lop 331 for storing configuration data to be written into the flip-flop 351, and a read flip-flop 332 for storing status data read out from the flip-flop 352. The user block 360 includes a first user flip-flop 361 for storing configuration data received from the flip-flop 351, and a second user flip-flop 352 for storing status data to be provided to the flip-flop 353. The flip-flop 351 can be a flip-flop of a configuration register (not shown), while the flip-flop 352 can be a flip-flop of a status register (not shown). Similar to the clock gate 140, the clock gate 340 gates a source clock signal 341, and generates a gated clock signal 342 when triggered by a trigger signal 343 from the access circuitry 330.

Based on the timing constraint relaxation scheme, timing-constraint-relaxed paths 353 and 354 can be obtained between the write or read flip-flop 331 or 332 and the flip-flops 351-352. The flip-flops 351-352 are disposed in relatively close physical proximity to the user block 360. The user block 360 is disposed at a desired location that is relatively distant from the access circuitry 330. Accordingly, a propagation distance between the flip-flop 351 or 352 and its corresponding write or read flip-flop 331 or 332 can be multiple cycles of the source clock signal 341.

Specifically, in a first example, the access circuitry 330 performs a write process to store configuration data into the flip-flop 351. For example, the access circuitry 330 can receive a write request from the management module 310. The write request includes a write command together with the configuration data. The write request specifies the target flip-flop 351 (or a target register including the flip-flop 351), for example, by providing an address of the target flip-flop 351 (or register). In one example, a decision on which target register to write data from the management module 310 is received on second clock-trigger. In response to receiving the write request, the access circuitry 330 generates a first trigger signal 343 to trigger the clock gate 340 to generate a first gated clock signal 342. The first gated clock signal 342 triggers the write flip-flop 331 to capture the configuration data at an input side and to launch the configuration data at an output side, in an embodiment. The launched configuration data propagates along the data path 354 between the write flip-flop 331 and the flip-flop 351.

After the launch of the configuration data from the write flip-flop 331, the access circuitry generates a second trigger signal 343. Generation of the second trigger signal 343 is delayed by a first predetermined amount of time that is larger than a cycle of the source clock signal 341 with respect to the first trigger signal 343. As a result, a second gated clock signal 342 (e.g., a cycle of the source clock signal) is generated at a time that is delayed by the first predetermined amount of time with respect to the launch of the configuration data. Subsequently, clocked by the delayed second gated clock signal 342, the flip-flop 351 captures the configuration data launched from the write flip-flop 331. A delay between the launch and capture of the configuration data is generally determined by the first predetermined amount of time, and corresponds to the relaxed timing constraint over the propagation path 354. Thereafter, the configuration data can be stored into the user flip-flop 361 and used by the user block 360.

In a second example, the access circuitry 330 performs a read process to read the status data out of the flip-flop 352 along the data path 353. For example, the access circuitry 330 can receive a read request from the management module 310. The read request includes a read command. The read request specifies the target flip-flop 352 (or a target register including the flip-flop 352), for example, by providing an address of the flip-flop 352 (or the register). For example, the target flip-flop 352 is selected among multiple status flip-flops during the propagation of signals from the multiple flip-flops to the flip-flop 332. In response to receiving the read request, the access circuitry 330 may generate a third trigger signal 343 to trigger the clock gate 340 to allow a cycle of the source clock signal 341 to pass the clock gate 340, resulting in a third gated clock signal 342. Clocked by the third gated clock signal 342, the flip-flop 352 captures status data from the user flip-flop 362 at an input side, and launches the status data at an output side. The launched status data propagates along the data path 353 towards the flip-flop 332.

After the launch of the status data from the flip-flop 352, the access circuitry 330 generates a fourth trigger signal 343 to trigger the clock gate 340 to generate a fourth gated clock signal 342. The fourth gated clock signal 342 triggers the flip-flop 332 to capture the status data from the flip-flop 352. The fourth trigger signal 343 is delayed by a second predetermined amount of time with respect to generation of the third trigger signal 343 for triggering the clock gate 340. Similarly, the second predetermined amount of time is longer than a cycle of the source clock signal 341 such that the flip-flop 332 can avoid capturing a metastable value at the input of the flip-flop 332. The capture of the status data is delayed by the second predetermined amount of time with respect to the launch of the status data. A delay between the launch and capture of the status data corresponds to the relaxed timing constraint over the propagation path 353. Thereafter, the status data can be transmitted to the management module 310.

Figure 4:
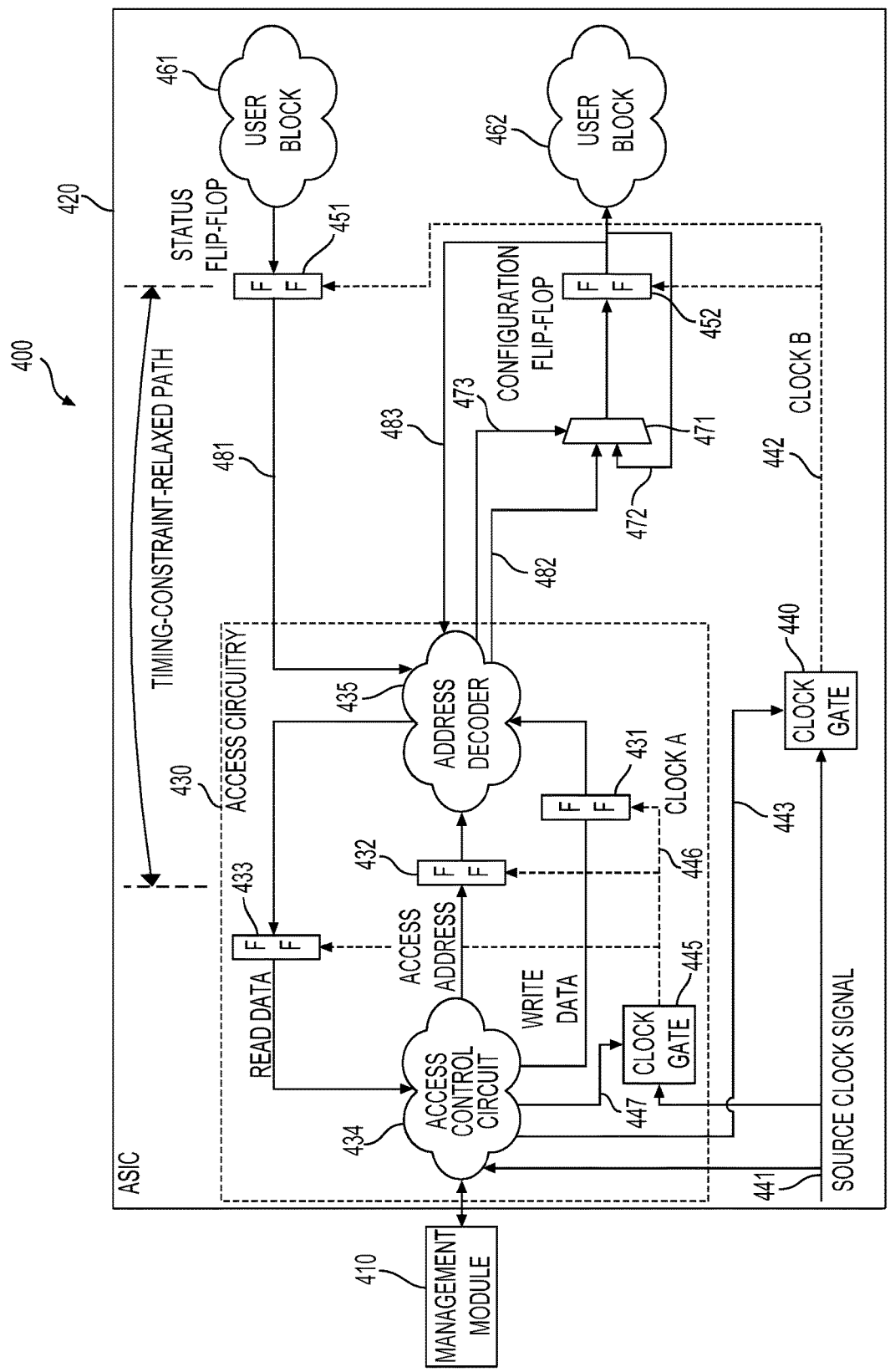
FIG. 4 shows another electronic device employing two clock gates to relax timing constraints over data path according to an embodiment of the disclosure.

FIG. 4 shows an electronic device 400 according to an embodiment of the disclosure. Compared with the FIG. 3 example, more details are illustrated for explanation of the timing constraint relaxation scheme in the FIG. 4 example. As shown, the electronic device 400 includes a management module 410 and an ASIC 420. The ASIC 420 includes access circuitry 430, a clock gate 440, a status flip-flop 451 for storage of status data, a configuration flip-flop 452 for storage of configuration data, a multiplexer (MUX) 471, a user block 461 providing the status data to the status flip-flop 451, and a user block 462 receiving the configuration data from the configuration flip-flop 452. In one example, the access circuitry 430 includes an access control circuit 434, a clock gate 445, a read flip-flop 433, an address flip-flop 432, a write flip-flop 431, and an address decoder 435. Those components are coupled together as shown in FIG. 4.

The clock gates 440 and 445 function in a way similar to the clock gate 340. For example, the clock gate 440 is configured to gate a source clock signal 441, and selectively transmit a clock pulse to generate a gated clock signal 442 (clock B) when triggered by a trigger signal 443 from the access control circuit 434. For example, the clock gate 445 is configured to gate the source clock signal 441, and selectively transmit a clock pulse to generate a gated clock signal 446 (clock A) when triggered by a trigger signal 447 from the access control circuit 434. Although not shown, in some examples, the gated clock signal 442 or 446 is distributed in the ASIC 420 using a clock distribution network. The clock distribution network includes, for example, clock buffers and jitter attenuators.

The access control circuit 434 is configured to perform control functions in response to a write or read request received from the management module 410 via a management interface. For example, the access control circuit 434 can generate the trigger signals 443 and 447 at suitable times to trigger the clock gate 440 or 445 to generate the gated clock signal 442 or 446, respectively. In an example, the access control circuit 434 includes logic implementing a finite state machine (FSM) (not shown). The FSM operates under the control of the source clock signal 441 in one example. The FSM performs the control functions according to the write or read command included in the write or read requests. In one example, instead of using the clock gate 445 to generate the gated clock signal 446 to control the flip-flops 431-433, the access control circuit 434 is configured to generate control signals at suitable times to control the flip-flops 431-433.

The flip-flops 431-433 are controlled by the gated clock signal 446 (clock A) to capture or launch data. For example, when clocked by the gated clock signal 446, the write flip-flop 431 captures write data from the access control circuit 434 at one side, and subsequently launch the write data towards a target configuration register at the other side. Similarly, when clocked by the gated clock signal 446, the address flip-flop 432 captures access address data from the access control circuit 434 at one side, and subsequently launches the access address data towards the address decoder 435 at the other side. At the read flip-flop 433, when clocked by the gated clock signal 446, the read flip-flop 433 captures status data from a target status register or configuration register at one side, and launches the read data towards the access control circuit 434 at the other side.

The address decoder 435 is configured to establish a data path between a flip-flop within the access circuitry 430 and a configuration or status register or flop-flop disposed close to a user block according to access address data received from the address flip-flop 432. As shown, the address decoder 435 is connected to the status flip-flop 451 via a path 481 for reading data. The address decoder 435 is connected to the configuration flip-flop 452 via a path 482 (goring through the MUX 471) for writing data, and a path 483 for reading data. In addition, the MUX 471 is disposed in front of the configuration flip-flop 452. Controlled by a write or read selector signal 473 from the address decoder 436, the MUX 471 selectively allows the writing path 482 or a loopback path 472 to be connected to an input of the configuration flip-flop 452. This loop structure enables the read and write operations to be performed on the same flip-flop 452, and provides positive feedback to enhance a stability of the output signal of the flip-flop 452 when the read operation is performed. The MUX 471 also allows the intended flip-flop 452 to be selected among multiple configuration flip-flops when a write operation is performed.

Figure 5:
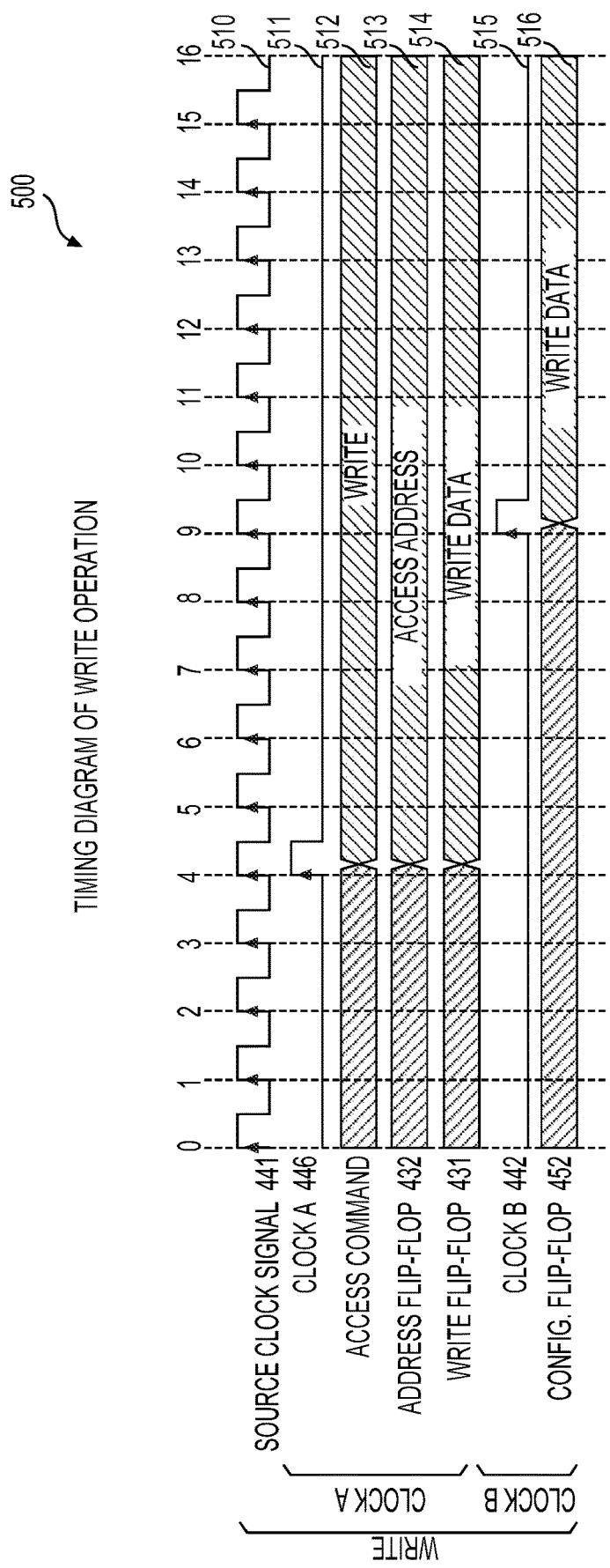
FIG. 5 shows a timing diagram of a write operation corresponding to the FIG. 4 example according to an embodiment of the disclosure.

FIG. 5 shows a timing diagram 500 of a write operation corresponding to the FIG. 4 example according to an embodiment of the disclosure. The diagram 500 shows the source clock signal 441, the clock A 446, an access command signal, state of the address flip-flop 432, state of the write flip-flop 431, the clock B 442, and state of the configuration flip-flop 452 in rows 510-516. The source clock signal 441 includes a sequence of pulses. A rising edge of each pulse is numbered from 0 to 16 to indicate a sequence of times from clock 0 to clock 16.

At clock 4, the clock gate 445 is open, and the clock gate 440 is closed. An unsuppressed portion of clock A (a clock pulse) is generated. In response to clock A, the write flip-flop 431 samples and locks the write data, and the address flip-flop 432 samples and lock the access address. The access command of write is issued for control of the address decoder 435.

From clock 5 to clock 8, both the clock gate 445 and the clock gate 440 are closed. The logic circuit of the address decoder 435 operates to connect the data path 482 between the write flip-flop 431 and the configuration flip-flop 452 in response to the access command of write and the access address stored in the address flip-flop 432. The control signal 473 is generated by the address decoder 435 to enable the data path 482 to pass the MUX 471. A signal of the write data launched from the write flip-flop 431 propagates along the established data path 482.

At clock 9, the clock gate 445 is maintained closed, however, the clock gate 440 is open. An unsuppressed portion of clock B (a clock pulse) is generated. In response to clock B, the configuration flip-flop 452 samples and locks the write data. The clock pulse of clock B is delayed by 5 cycles of the source clock signal 441 after the clock pulse of clock A. Because the delay of the unsuppressed portion of clock B with respect to the unsuppressed portion of clock A, the timing constraint over the data path 482 is relaxed by 5 cycles of the source clock signal 441. With the relaxed timing constraint (5 cycles), the signal of the write data can travel a long distance along the established data path 482 and reach the flip-flop 452 without violating the respective timing constraint. No intervening flip-flops or buffers are needed to partition the data path 482 into shorter segments. The delay is referred to as a timing constraint relaxation factor.

Figure 6:
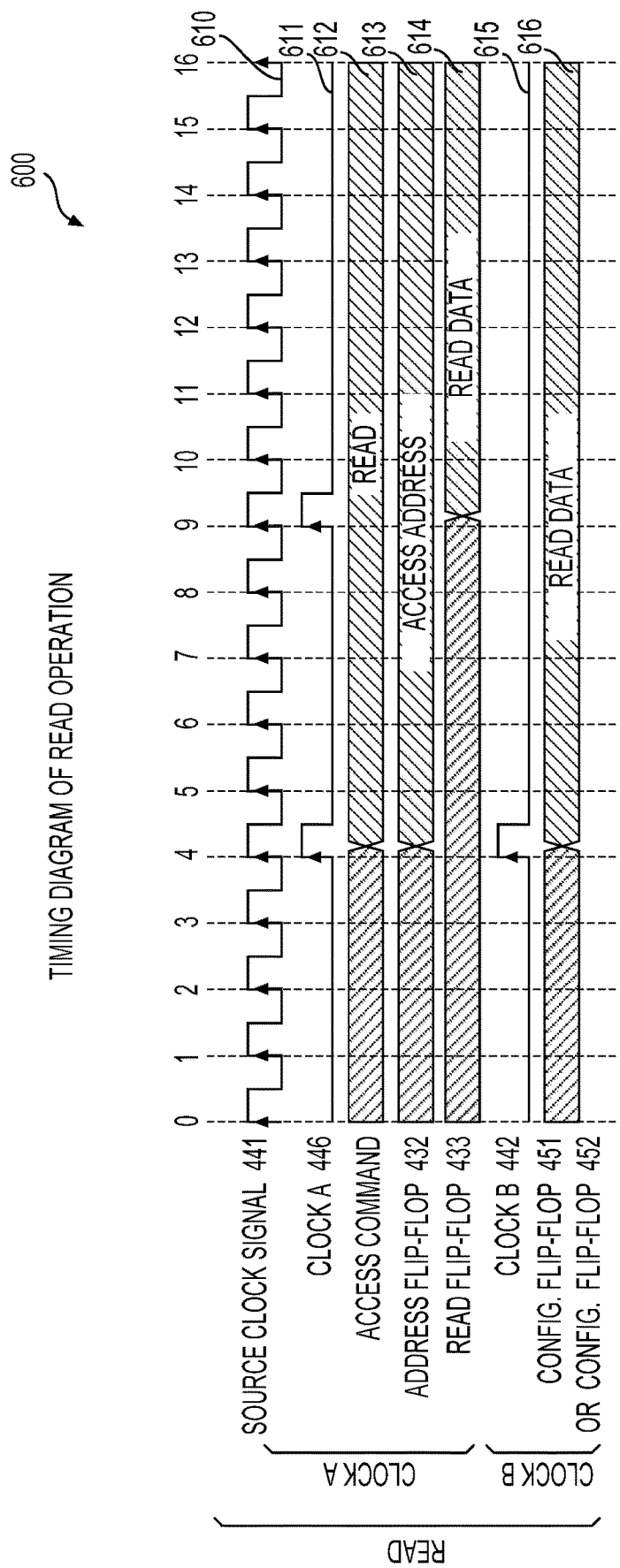
FIG. 6 shows a timing diagram of a read operation corresponding to the FIG. 4 example according to an embodiment of the disclosure.

At clock 10, both the clock gate 445 and the clock gate 440 are closed. FIG. 6 shows a timing diagram 600 of a read operation corresponding to the FIG. 4 example according to an embodiment of the disclosure. The diagram 600 shows the source clock signal 441, the clock A 446, an access command signal, state of the address flip-flop 432, state of the read flip-flop 433, the clock B 442, and state of the configuration flip-flop 452 or the status flip-flop 451 in rows 610-616. Similarly, the source clock signal 441 includes a sequence of pulses. A rising edge of each pulse is numbered from 0 to 16 to indicate a sequence of times from clock 0 to clock 16.

At clock 4, both the clock gate 445 and the clock gate 440 are open. An unsuppressed portion of clock A (a clock pulse) is generated. In response to clock A, the address flip-flop 432 samples and lock the access address. The access command of read is issued for control of the address decoder 435. An uncompressed portion of clock B (a clock pulse) is also generated. In response to clock B, the configuration flip-flop 452 and the status flip-flop 451 prepare the read data. For example, the control signal 473 is in a state that allows the loop 472 to be formed passing the MUX 472. The configuration flip-flop 452 launches the configuration data stored therein. The status flip-flop 451 samples and locks status data received from the user block 461.

From clock 5 to clock 8, both the clock gate 445 and the clock gate 440 are closed. In response to the access command of read, the logic circuit of the address decoder 435 operates to connect the data path 483 between the read flip-flop 433 and the configuration flip-flop 452, or connect the data path 481 between the read flip-flop 433 and the status flip-flop 451, depending on the access address stored in the address flip-flop 432. A signal of the read data launched from the flip-flops 451 or 452 propagates along the established data path.

At clock 9, the clock gate 440 is maintained closed, however, the clock gate 445 is open. An unsuppressed portion of clock A (a clock pulse) is generated. In response to clock A, the read flip-flop 433 samples and locks the read data. The clock pulse of clock A is delayed by 5 cycles of the source clock signal 441 after the clock pulse of clock B. Because the delay of the unsuppressed portion of clock A with respect to the unsuppressed portion of clock B, the timing constraint over the data path 481 or 483 is relaxed by 5 cycles of the source clock signal 441.

At clock 10, both the clock gate 445 and the clock gate 440 are closed.

While flip-flops (e.g., read flip-flop, write flip-flop, address flip-flop, configuration flip-flop, and status flip-flop) are used in FIGS. 3-7 examples for explanation of the timing constraint relaxation scheme, the descriptions of FIGS. 3-7 examples are also applicable to examples where registers are used in place of the respective flip-flops. Generally, both flip-flops and registers are memory elements of sequential circuits that operate under the control of a clock signal. A register can include one or more flip-flops controlled by a same clock signal to capture or launch data. Thus, the timing constraint relaxation scheme described herein is applicable to registers as well as flip-flops.

Figure 7:
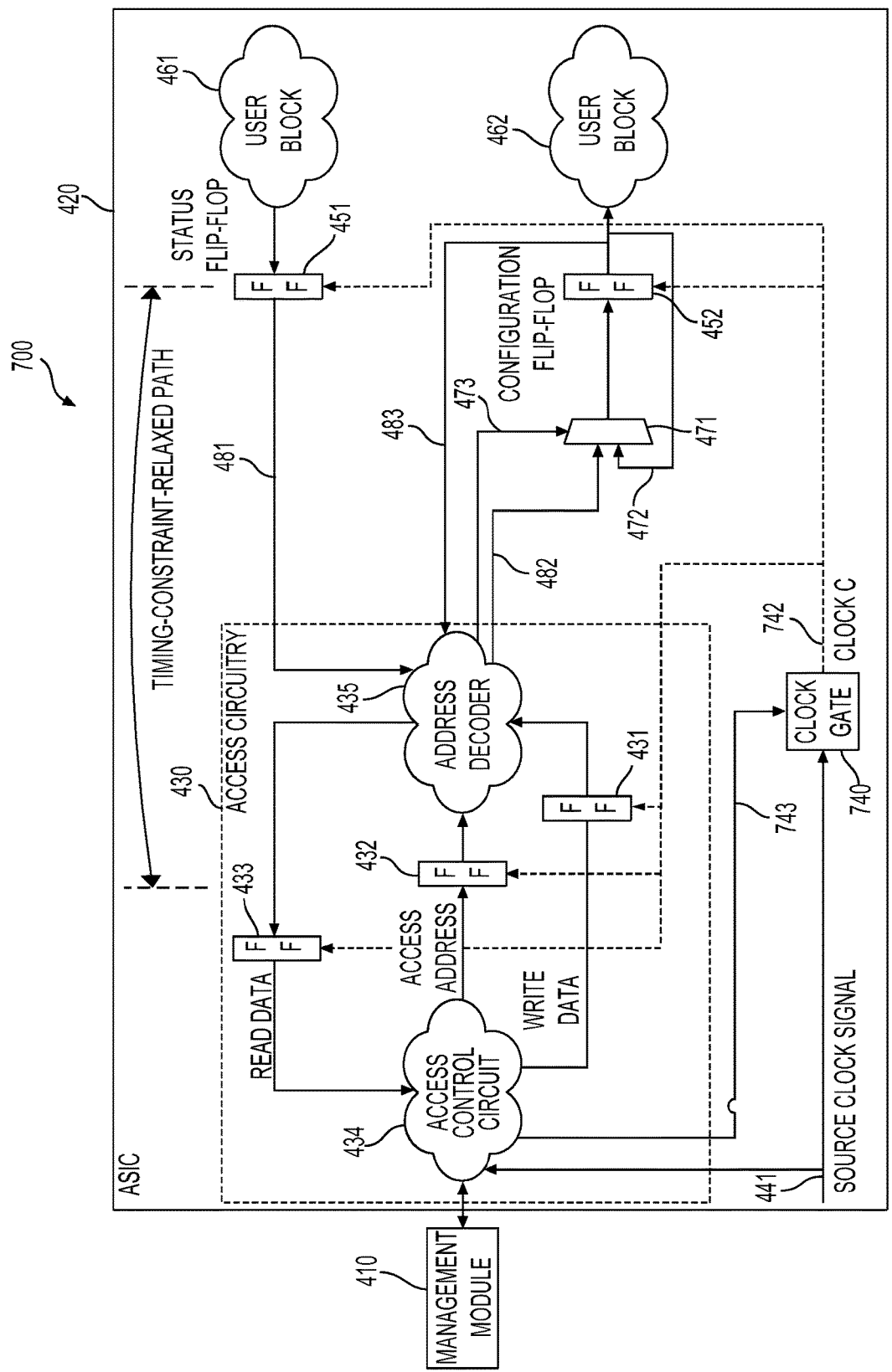
FIG. 7 shows another electronic device configured with one clock gate according to an embodiment of the disclosure.

FIG. 7 shows another electronic device 700 according to an embodiment of the disclosure. As shown, the electronic device 700 is similar to the electronic device 400 in FIG. 4 example. However, instead of employing two clock gates 445 and 440, the electronic device 700 uses one clock gate 740 to generate a gated clock signal 742 (clock C) to control both the left side flip-flops 431-433 and the right side flip-flops 451-452. For example, similar to the FIG. 4 example, when performing a write or read operation, the access control circuit 434 generates a trigger signal 743 at timings similar to the timings of the trigger signals 447 or 443 in FIG. 4 example. In this way, similar timing constraint relaxation mechanism can be realized with one clock gate 740.

Figure 8:
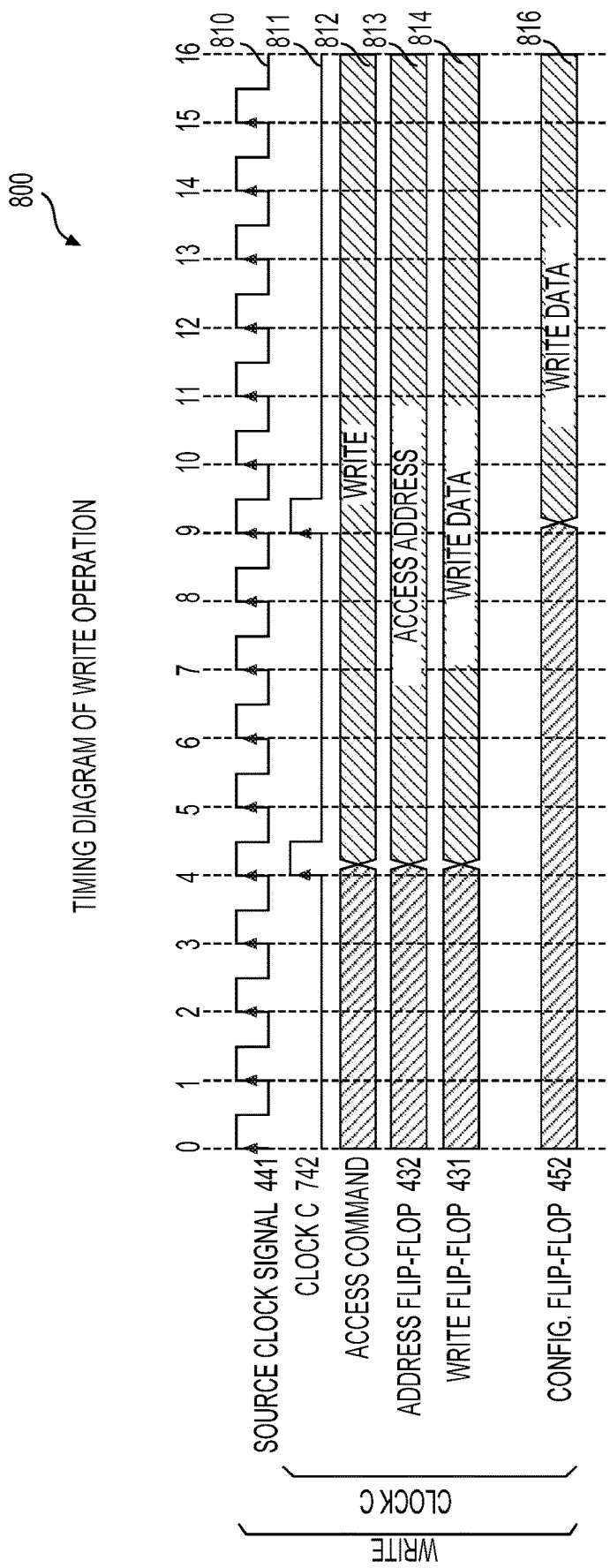
FIG. 8 shows a timing diagram of a write operation corresponding to the FIG. 7 example according to an embodiment of the disclosure.

FIG. 8 shows a timing diagram 800 of a write operation corresponding to the FIG. 7 example according to an embodiment of the disclosure. The timing diagram 800 is similar to the timing diagram 500 in FIG. 5. However, the clock A 446 and clock B 442 in FIG. 5 are replaced with the clock C 742 in FIG. 8. As shown, the clock C is a combined signal of the clocks A and B, and the two gated clock signals of clock A and clock B are combined into the gated signal C, and the timings of the two gated clock signals are maintained. Similar to FIG. 5, the source clock signal 441, the clock C 742, the access command signal, the state of the address flip-flop 432, the state of the write flip-flop 431, and the state of the configuration flip-flop 452 are shown in rows 810-814 and 816. Controlled by the clock C, the write operation can be similarly performed as in FIG. 5 example.

Figure 9:
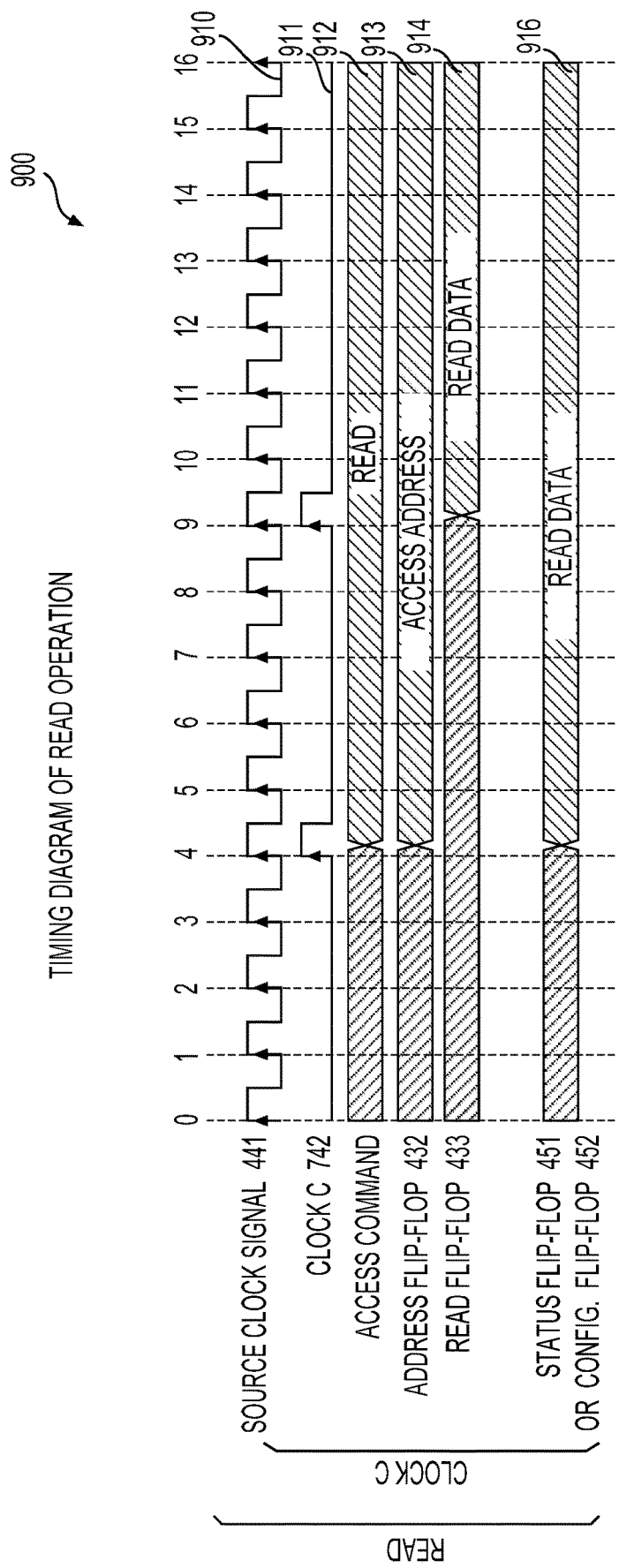
FIG. 9 shows a timing diagram of a read operation corresponding to the FIG. 7 example according to an embodiment of the disclosure.

FIG. 9 shows a timing diagram 900 of a read operation corresponding to the FIG. 7 example according to an embodiment of the disclosure. The timing diagram 900 is similar to the timing diagram 600 in FIG. 6. However, the clock A 446 and clock B 442 in FIG. 6 are replaced with the clock C 742 in FIG. 9. As shown, the clock C is a combined signal of the clocks A and B, and the two gated clock signals of clock A and clock B are combined into the gated signal C, and the timings of the two gated clock signals are maintained. Similar to FIG. 6, the source clock signal 441, the clock C 742, the access command signal, the state of the address flip-flop 432, the state of the read flip-flop 433, and the state of the configuration flip-flop 451 or the status flip-flop 452 are shown in rows 810-814 and 816. Controlled by the clock C, the write operation can be similarly performed as in FIG. 6 example.

Figure 10:
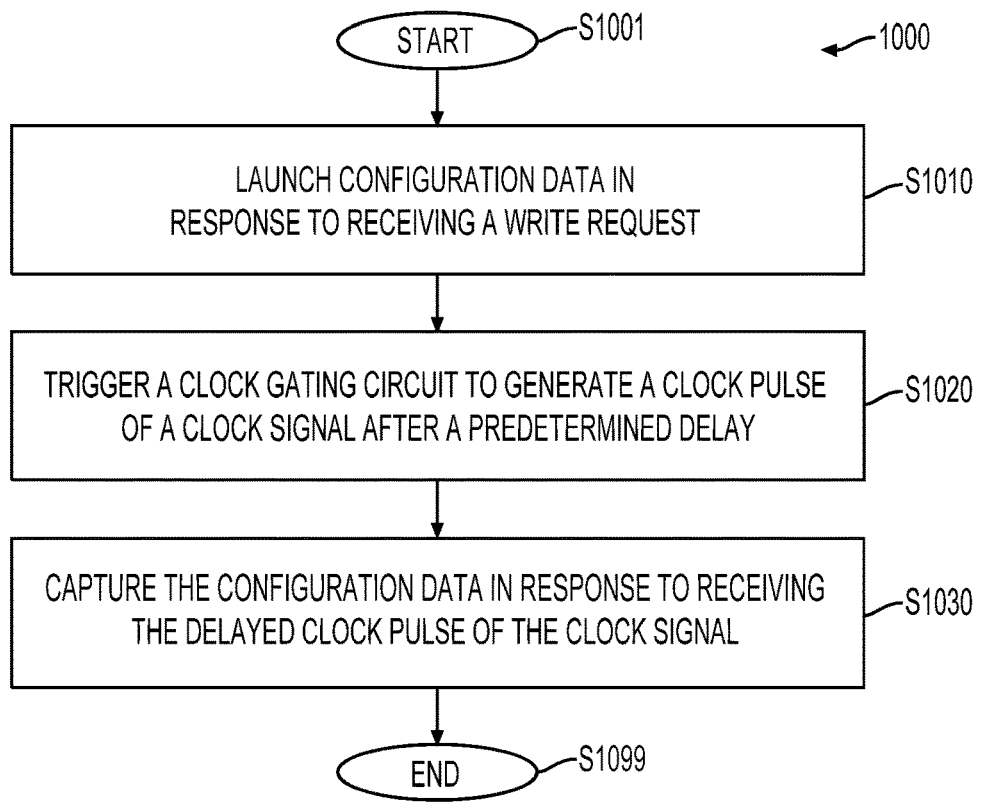
FIG. 10 shows a process of writing configuration data from access circuitry of a management interface to a target memory element disposed near a user block in an application specific integrated circuit (ASIC) according to an embodiment of the disclosure.

FIG. 10 shows a process 1000 of writing configuration data from access circuitry of a management interface to a target memory element disposed near a user block in an ASIC. The ASIC operates under control of a source clock signal, in an embodiment. A data path between a source memory element in the access circuitry and the target memory element is a multi-cycle data path. A timing constraint over the multi-cycle data path is relaxed by controlling a clock gating circuit to generate a delayed gated clock signal. The process 1000 starts from S1001 and proceeds to S1010.

At S1010, the configuration data is launched from the access circuitry in response to receiving a write request from a management module outside of the ASIC.

At S1020, a clock gating circuit is triggered by the access circuitry to generate a clock pulse of the source clock signal after a predetermined delay with respect to the launch of the configuration data. For example, the clock pulse is delayed by a predetermined amount of time after the launch of the configuration data. During this delay, a signal of the configuration data propagates along the multi-cycle data path, and reaches the target memory element. A stable input of the configuration data is established at the target memory element.

At S1030, the configuration data is captured by the target memory element in response to receiving the delayed clock pulse of the clock signal. The process 1000 proceeds to S1099 and terminates at S1099.

Figure 11:
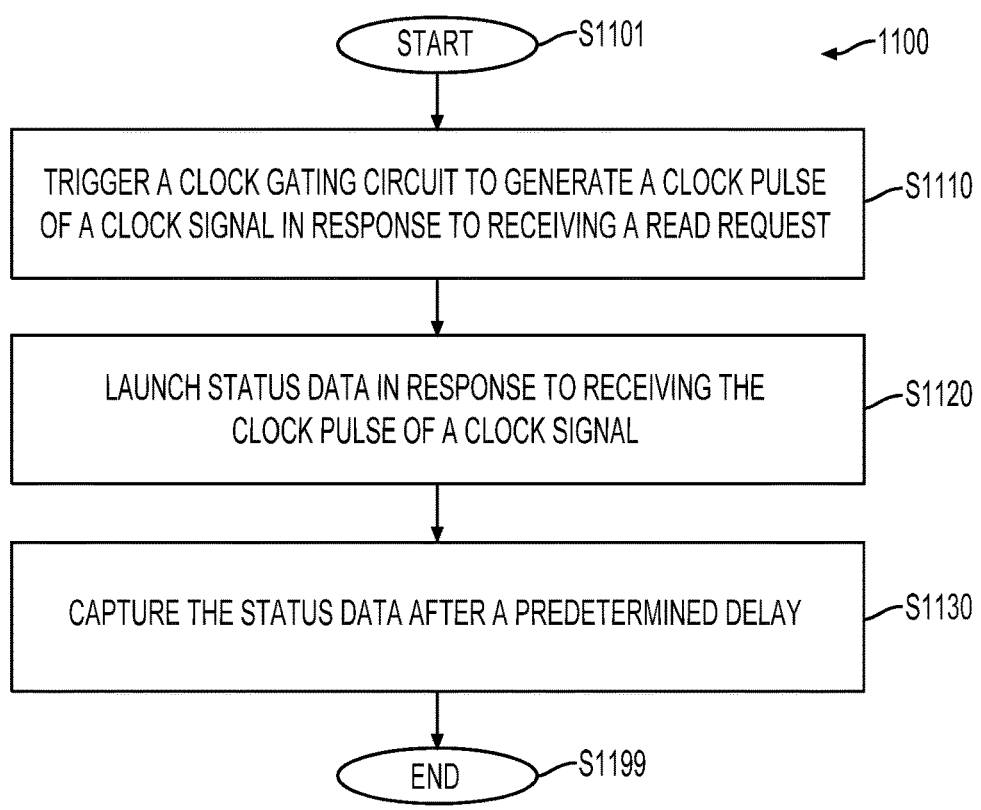
FIG. 11 shows a process of reading status data from a target memory element at access circuitry of a management interface in an ASIC according to an embodiment of the disclosure.

FIG. 11 shows a process 1100 of reading status data from a target memory element at access circuitry of a management interface in an ASIC. Similarly, the ASIC operates under the control of a source clock signal. The target memory element is disposed close to a user block providing the status data. A data path between a destination memory element within the access circuitry and the target memory element is a multi-cycle data path. A timing constraint over the multi-cycle data path is relaxed by controlling a clock gating circuit to generate a gated clock signal. The process 1100 starts from S1101 and proceeds to S1110.

At S1110, the clock gating circuit is triggered by the access circuitry to generate a clock pulse of the source clock signal in response to receiving a read request at the access circuitry from a management module outside of the ASIC.

At S1120, the status data is launched by the target memory element in response to receiving the clock pulse of the source clock signal from the clock gating circuit.

At S1130, the status data is captured by the destination memory element at the access circuitry after a predetermined amount of time since the launch of the status data. During the predetermined amount of time, the status data propagates along the multi-cycle path from the target memory element to the destination memory element. A stable input of the status data is established at the destination memory element. Then, the access circuitry generates a trigger signal (e.g., the clock B signal) to trigger the destination memory element to capture the status data. The process 1100 proceeds to S1199, and terminates at S1199.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An electronic device, comprising:
a first clock gating circuit that is configured to receive a clock signal and selectively transmit a clock pulse of the clock signal when triggered;
access circuitry configured to:
launch configuration data in response to receiving a write request from a management module, and
trigger the first clock gating circuit to generate a first gated clock pulse in a selected clock domain among two or more clock domains having respectively different timing constraints, the first gated clock pulse being delayed by a first predetermined amount of time after the launch of the configuration data by the access circuitry to relax a timing constraint over data paths for transmission of the configuration data from the access circuitry to components in the selected clock domain relative to a clock domain controlled by the clock signal; and
a first memory element in the selected clock domain configured to capture the configuration data in response to receiving the delayed first gated clock pulse generated by the first clock gating circuit.

2. The electronic device of claim 1, wherein
the first memory element is further configured to launch the configuration data in response to receiving a second gated clock pulse generated by the first clock gating circuit; and
the access circuitry is further configured to,
trigger the first clock gating circuit to generate the second gated clock pulse in response to receiving a read request from the management module, and
capture the configuration data launched by the first memory element after a second predetermined amount of time since the launch of the configuration data by the first memory element.

3. The electronic device of claim 1, further comprising:
first user circuitry that is controlled by the clock signal and that receives the configuration data from the first memory element, where the first memory element is spaced more than a cycle of the clock signal away fro the access circuitry, but less than a cycle of the clock signal away from the first user circuitry.

4. The electronic device of claim 1, further comprising:
a second memory element in the selected clock domain configured to launch status data in response to a third gated clock pulse generated by the first clock gating circuit,
wherein the access circuitry is further configured to:
trigger the first clock gating circuit to generate the third gated clock pulse in response to receiving a read request from the management module, and
capture the status data launched by the second memory element after a third predetermined amount of time since the launch of the status data by the second memory element.

5. The electronic device of claim 4, further comprising:
second user circuitry that is controlled by the clock signal and provides the status data to the second memory element, where the second memory element is spaced more than a cycle of the clock signal away from the access circuitry, but less than a cycle of the clock signal away from the second user circuitry.

6. The electronic device of claim 1, wherein the access circuitry further comprises:
a second clock gating circuit configured to receive the clock signal and selectively transmit a clock pulse of the clock signal when triggered;
a third memory element in the selected clock domain configured to launch the configuration data in response to a fourth gated clock pulse generated by the second clock gating circuit; and
a control circuit configured to:
trigger the second clock gating circuit to generate the fourth gated clock pulse in response to receiving the write request from the management module, and
trigger the first clock gating circuit to generate the first gated clock pulse that is delayed by the first predetermined amount of time after the launch of the configuration data by the third memory element.

7. The electronic device of claim 6, wherein the access circuitry further comprises:
a fourth memory element in the selected clock domain that is configured to, in response to a fifth gated clock pulse generated by the second clock gating circuit, capture the configuration data launched from the first memory element,
wherein the control circuit of the access circuitry is further configured to:
trigger the first clock gating circuit to generate a clock pulse to trigger the launch of the configuration data from the first memory element in response to receiving a read request from the management module, and
trigger the second clock gating circuit to generate the fifth gated clock pulse that is delayed by a second predetermined amount of time after the launch of the configuration data from the first memory element.

8. The electronic device of claim 6, wherein the access circuitry further comprises:
a fourth memory element in the selected clock domain that is configured to, in response to a fifth gated clock pulse generated by the second clock gating circuit, capture status data launched from a second memory element,
wherein the control circuit of the access circuitry is further configured to:
trigger the first clock gating circuit to generate a clock pulse to trigger the launch of the status data from the second memory element in response to receiving a read request from the management module, and
trigger the second dock gating circuit to generate the fifth gated dock puke that is delayed by a third predetermined amount of time after the launch of the status data from the second memory element.

9. The electronic device of claim 8, wherein the access circuitry further comprises:
an address decoder circuit configured to select a path between the third or fourth memory element and a plurality of memory elements for a write or read operation according to an address included in the read or write request received from the management module, the plurality of memory elements being controlled by gated clock pulses generated by the first clock gating circuit.

10. The electronic device of claim 1, wherein the access circuitry further comprises:
a third memory element in the selected clock domain configured to launch the configuration data in response to a fourth gated clock pulse generated by the first clock gating circuit; and
a control circuit configured to:
trigger the first clock gating circuit to generate the fourth gated clock pulse in response to receiving the write request from the management module, and
trigger the first clock gating circuit to generate the first gated clock pulse that is delayed by the first predetermined amount of time after the launch of the configuration data by the third memory element.

11. The electronic device of claim 10, wherein the access circuitry further comprises:
a fourth memory element in the selected dock domain that is configured to, in response to a fifth gated dock pulse generated by the first clock gating circuit, capture the configuration data launched from the first memory element,
wherein the control circuit of the access circuitry is further configured to:
trigger the first clock gating circuit to generate a clock pulse to trigger the launch of the configuration data from the first memory element in response to receiving a read request from the management module, and
trigger the first clock gating circuit to generate the fifth gated clock pulse that is delayed by a second predetermined amount of time after the launch of the configuration data from the first memory element.

12. The electronic device of claim 10, wherein the access circuitry further comprises:
a fourth memory element in the selected clock domain that is configured to, in response to a fifth gated clock pulse generated by the first clock gating circuit, capture status data launched from a second memory element,
wherein the control circuit of the access circuitry is further configured to:
trigger the first clock gating circuit to generate a clock pulse to trigger the launch of the status data from the second memory element in response to receiving a read request from the management module, and
trigger the first dock gating circuit to generate the fifth gated dock puke that is delayed by a third predetermined amount of time after the launch of the status data from the second memory element.

13. The electronic device of claim 10, wherein the control circuit is controlled by the clock signal.

14. The electronic device of claim 1 wherein the selected clock domain has a relaxed timing constraint relative to others of the two or more clock domains.

15. The electronic device of claim 1 wherein the clock signal is supplied without gating to others of the two or more clock domains.

16. A method, comprising:
receiving, by an access circuitry in an electronic device, a write request from a management module;
launching, by the access circuitry in the electronic device, configuration data in response to receiving the write request from the management module;
triggering, by the access circuitry, a first clock gating circuit to generate, in a selected clock domain among two or more clock domains having respectively different timing constraints, a first gated clock pulse of a clock signal that is received at the first clock gating circuit, the first gated clock pulse of the clock signal being delayed by a first predetermined amount of time after the launch of the configuration data by the access circuitry to relax a timing constraint over data paths for transmission of the configuration data from the access circuitry to components in the selected clock domain relative to a clock domain controlled by the clock signal; and capturing, by a first memory element in the selected clock domain, the configuration data in response to receiving the delayed first gated clock pulse of the clock signal generated by the first clock gating circuit.

17. The method of claim 16, further comprising:

triggering, by the access circuitry, the first clock gating circuit to generate a second gated clock pulse of the clock signal in response to receiving a read request from the management module;

launching, by the first memory element, the configuration data in response to receiving the second gated clock pulse of the clock signal generated by the first clock gating circuit; and capturing, by the access circuitry, the configuration data launched by the first memory element after a second predetermined amount of time since the launch of the configuration data by the first memory element.

18. The method of claim 16, further comprising:

receiving, by first user circuitry that is controlled by the clock signal, the configuration data from the first memory element, wherein the first memory element is spaced more than a cycle of the clock signal away from the access circuitry, but less than a cycle of the clock signal away from the first user circuitry.

19. The method of claim 16, further comprising:

triggering, by the access circuitry, the first clock gating circuit to generate a third gated clock pulse of the clock signal in response to receiving a read request from the management module;

launching, by a second memory element in the selected clock domain, status data in response to receiving the third gated clock pulse of the clock signal generated by the first clock gating circuit; and capturing, by the access circuitry, the status data launched by the second memory element after a third predetermined amount of time since the launch of the status data by the second memory element.

20. The method of claim 19, further comprising:

providing, by second user circuitry that is controlled by the clock signal, the status data to the second memory element, wherein the second memory element is spaced more than a cycle of the clock signal away from the access circuitry, but less than a cycle of the clock signal away from the second user circuitry.

21. The method of claim 19, further comprising:

triggering, by a control circuit in the access circuitry, a second clock gating circuit to generate a fourth gated clock pulse of the clock signal received at the second clock gating circuit in response to receiving the write request from the management module;

launching, by a third memory element in the selected clock domain, the configuration data in response to receiving the fourth gated clock pulse of the clock signal generated by the second clock gating circuit; and triggering, by the control circuit, the first clock gating circuit to generate the first gated clock pulse of the clock signal that is delayed by the first predetermined amount of time after the launch of the configuration data by the third memory element.

22. The method of claim 21, further comprising:

triggering, by the control circuit, the first clock gating circuit to generate a fifth gated clock pulse of the clock signal in response to receiving a read request from the management module;

launching, by the first memory element, the configuration data in response to receiving the fifth gated clock pulse of the clock signal;

triggering, by the control circuit, the second clock gating circuit to generate a sixth gated clock pulse of the clock signal that is delayed by a predetermined amount of time after the launch of the configuration data from the first memory element; and capturing, by a fourth memory element in the selected clock domain, the configuration data launched from the first memory element in response to the sixth gated clock pulse of the clock signal generated by the second clock gating circuit.

23. The method of claim 21, further comprising:

triggering, by the control circuit, the first clock gating circuit to generate a fifth gated clock pulse of the clock signal in response to receiving a read request from the management module;

launching, by the second memory element in the selected clock domain, status data in response to receiving the fifth gated clock pulse of the clock signal;

triggering, by the control circuit, the second clock gating circuit to generate a sixth gated clock pulse of the clock signal that is delayed by a predetermined delay after the launch of the status data from the second memory element; and capturing, by a fourth memory element in the selected clock domain, the status data launched from the second memory element in response to receiving the sixth gated clock pulse of the clock signal generated by the second clock gating circuit.

24. The method of claim 23, further comprising:

selecting, by an address decoder circuit, a path between (i) the third or fourth memory element capturing the configuration data launched from the first memory element or status data launched from the second memory element and (ii) a plurality of memory elements for a write or read operation according to an address included in the read or write request received from the management module, the plurality of memory elements being controlled by gated clock signals generated by the first clock gating circuit.

25. The method of claim 16, further comprising:

triggering, by a control circuit in the access circuitry, the first clock gating circuit to generate a fourth gated clock pulse of the clock signal received at the first clock gating circuit in response to receiving the write request from the management module;

launching, by a third memory element in the selected clock domain, the configuration data in response to receiving the fourth gated clock pulse of the clock signal generated by the first clock gating circuit; and triggering, by the control circuit, the first clock gating circuit to generate the first gated clock pulse of the clock signal that is delayed by the first predetermined amount of time after the launch of the configuration data by the third memory element.

26. The method of claim 25, further comprising:

triggering, by the control circuit, the first clock gating circuit to generate a fifth gated clock pulse of the clock signal in response to receiving a read request from the management module;

launching, by the first memory element, the configuration data in response to receiving the fifth gated clock pulse of the clock signal;

triggering, by the control circuit, the first clock gating circuit to generate a sixth gated clock pulse of the clock signal that is delayed by a second predetermined amount of time after the launch of the configuration data from the first memory element; and capturing, by a fourth memory element in the selected clock domain, the configuration data launched from the first memory element in response to the sixth gated clock pulse of the clock signal generated by the first clock gating circuit.

27. The method of claim 25, further comprising:

triggering, by the control circuit, the first clock gating circuit to generate a fifth gated clock pulse of the clock signal in response to receiving a read request from the management module;

launching, by a second memory element, status data in response to receiving the fifth gated clock pulse of the clock signal;

triggering, by the control circuit, the first clock gating circuit to generate a sixth gated clock pulse of the clock signal that is delayed by a second predetermined delay after the launch of the status data from the second memory element; and capturing, by a fourth memory element in the selected clock domain, the status data launched from the second memory element in response to receiving the sixth gated clock pulse of the clock signal generated by the first clock gating circuit.

28. An integrated circuit (IC), comprising:

a clock gating circuit that is configured to receive a clock signal and selectively to transmit a clock pulse of the clock signal when triggered;

access circuitry configured to,
  launch configuration data in response to receiving a write request from a management module, and
  trigger the dock gating circuit to generate a first gated dock puke in a selected dock domain among two or more dock domains having respectively different timing constraints, the first gated dock puke being delayed for a predetermined amount of time after the launch of the configuration data by the access circuitry to relax a timing constraint over data paths for transmission of the configuration data from the access circuitry to components in the selected dock domain relative to a dock domain controlled by the dock signal; and a memory element in the selected clock domain configured to capture the configuration data in response to receiving the delayed first gated clock pulse of the clock signal generated by the clock gating circuit.

* * * * *